Patented May 2, 1950

2,506,358

UNITED STATES PATENT OFFICE 2,506,358

PIECRUST MIX

Chastain G. Harrel, Robert O. Brown, and Mary H. Kimball, Minneapolis, Minn., assignors to Pillsbury Mills, Inc., Minneapolis, Minn., a corporation of Delaware No Drawing. Application September 27, 1948, Serial No. 51,486

7 Claims. (Cl. 99—94)

Our invention relates to prepared pie crust mixes and, more particularly, to dry, pulverulent pie crust mixes having improved resistance to moisture absorption from the fillings employed in the making of pies.

The common ingredients employed in pie crust mixes are shortening, flour and salt and in some cases baking powder is also present.

The selection, proportioning and blending of the ingredients of the pie crust mix is such that it is only necessary for the purchaser to add water to it to form a dough which is ready to be rolled out and baked.

When pies are made having a liquid filling and the pie crust mix is prepared in the usual fashion, the lower crust in the baked pie is usually found to be quite soggy, giving a poor flavor, texture and appearance to the lower crust as well as causing the lower crust to stick to the baking pan. The problem of sogginess is caused chiefly by the absorption of moisture from the liquid filling although it is also essential that the water which is added in the preparation of the dough be permitted to escape during the baking operation.

A comparison of the resistance of moisture absorption as between various pie crust mixes may be readily made by baking liquid-filled pies in transparent Pyrex baking pans and, if the pie crust mix is deficient in this respect, wet areas will be readily apparent upon visual examination of the bottom of the pie crust when the baking pan is inverted.

The object of the present invention is to produce a dry, pulverulent pie crust mix which will produce a more palatable, dry, light, flaky, moisture resistant lower crust that will not stick to the baking pan, the mix being capable of use with favorable results by inexperienced pie bakers and without preliminary cooking of the lower crust before the pie filling is inserted in the baking pan.

We have discovered that by adding a small quantity of powdered edible casein to the other usual ingredients and thoroughly mixing the same, a prepared pie crust mix is obtained which may be used by the housewife by merely adding water to it to form a dough and we have found that the lower crusts of pies prepared from such pie crust mixes will be free from the objectionable sogginess of other pie crusts even when liquid-filled pies, such as fruit pies, pumpkin pies, custard pies and the like are prepared.

A typical pie crust mix can be made in accordance with the invention by thoroughly mixing the following ingredients, the proportions being given by weight:

| | Per cent |
|---|---|
| Shortening | 32.00 |
| Flour | 65.00 |
| Salt | 2.00 |
| Baking powder | .75 |
| Powdered casein | .25 |

Considerable variation can be made in the proportions of shortening relative to flour. While a ratio of about two parts of flour to about one part of shortening is preferred, this could be varied within the range of one to three parts of flour to one part of shortening. Salt is present mainly for the purpose of enhancing the flavor of the product and may be omitted. The baking powder may also be omitted and in any case the quantity of baking powder used need not exceed about 1%. From .05% to 2.00% powdered casein is employed in the mix, it being preferable, however, that the casein constitute approximately .25% by weight of the total mix.

In preparing a pie crust from the mix referred to, a small quantity of water is added and the pie crust is rolled out whereupon the pie is made in the usual manner. It has been found that casein, when so employed, is dissolved by the water used in making the dough and, as a result of the slightly acid condition which exists in the pie crust mix, the casein will coagulate. This coagulation of the casein is apparently an important factor in the reduction of moisture absorption into the resulting pie crust. The pie crust mix described above has a pH, when in the form of a dough, of approximately 5.8 to 6.3 depending on the type of baking powder and flour that is used. The coagulation of the casein is a function of both temperature and acidity and it coagulates at a pH of about 4.8 to 5.2 at ordinary room temperature and at somewhat higher hydrogen-ion concentrations at higher temperatures. Normally the acidity of the pie crust mix is such as to insure that coagulation will take place at temperatures which are necessarily encountered during the baking of the crust. The desired acidity results from the presence in the mix of ordinary wheat flour and the use of commercial baking powders in moderate quantities has been found to have no undesirable influence on the hydrogen-ion concentration.

The casein which is employed is the ordinary relatively pure edible casein of commerce and as used herein the term "casein" includes sodium caseinate and other similar casein derivatives and modified caseins. The particle size of the casein is not a critical factor but it is preferred in commercial practice that the casein be ground to the approximate fineness of the flour, salt or other ingredients such as baking powder which may be used so as not to adversely affect the feel or appearance of the prepared mix.

We have found that the use of milk or dried milk powder does not give in any degree the results which are achieved by the use of casein. This may be due to the fact that milk or milk powder contains sugars which prevent the casein content of the milk from functioning in the manner desired. Possibly the buffering action of the other ingredients of milk prevents the coagulation of the casein, but whatever the cause, it is a fact that casein as such confers upon the pie crust mix a surprisingly high degree of resistance to moisture absorption during the cooking operation which cannot be achieved by the use of milk, dried whole milk or dried skimmed milk.

At the pH range encountered in a pie crust mix the casein coagulates upon the application of heat and, since the heat moves upwardly through the baking pan and upwardly through the lower crust, it will be apparent that coagulation will take place initially at the bottom surface of the crust and that coagulation will take place progressively in higher portions of the crust as the heat penetrates upwardly. Since the casein coagulates successively in the bottom to top strata of the pie crust, the moisture is permitted to escape upwardly into the pie filling from the portions of the pie crust wherein the casein has not coagulated and above the portions of the pie crust wherein the casein has coagulated. Since the crust is sealed off from water penetration from its bottom upwardly, the initial water content of the crust will be free to pass on upwardly through the crust in the form of steam and there is no entrapment of the water vapor in the lower crust.

What we claim as our invention is:

1. A pie crust mix comprising flour, shortening and a minor proportion of casein, said casein being present in substantially pure form and not as a constituent of milk.

2. A pie crust mix comprising flour, shortening and from .05% to 2.00% of substantially pure powdered casein.

3. A pie crust mix comprising flour, shortening and approximately 0.25% substantially pure powdered casein.

4. A pie crust mix comprising from one to three parts of flour, one part of shortening and 0.05% to 2.00% substantially pure powdered casein.

5. A pie crust mix comprising approximately two parts of flour, one part of shortening and 0.05% to 2.00% substantially pure powdered casein.

6. A pie crust mix including flour and a minor amount of substantially pure powdered casein, said casein having the property of coagulating upon the application of heat and imparting to the pie crust made therefrom a greater resistance to moisture absorption than such crusts made without said casein.

7. A pie crust mix including shortening, flour and substantially pure powdered casein, producing a dry non-soggy undercrust in a baked liquid-filled pie having its crust prepared from the mix, said casein being thoroughly and evenly mixed with the other ingredients, said casein as the pie is being baked, successively coagulating in bottom to top portions of the undercrust while permitting the upward escape of the moisture from the portions of the undercrust wherein the casein has not yet coagulated and above the layers wherein the casein has coagulated.

CHASTAIN G. HARREL.
ROBERT O. BROWN.
MARY H. KIMBALL.

REFERENCES CITED

The following references are of record in the file of this patent:

UNITED STATES PATENTS

| Number | Name | Date |
|---|---|---|
| 1,103,355 | Fabel | July 14, 1914 |
| 1,117,012 | Estabrook | Nov. 10, 1914 |
| 1,928,781 | Chapin | Oct. 3, 1933 |
| 2,035,899 | Kraft | Mar. 31, 1936 |
| 2,065,676 | Fechner | Dec. 29, 1936 |